United States Patent
Weiner et al.

(10) Patent No.: US 9,452,703 B2
(45) Date of Patent: Sep. 27, 2016

(54) VEHICLE WITH UPWARDLY MOVABLE DOOR

(71) Applicant: Domino's IP Holder LLC, Ann Arbor, MI (US)

(72) Inventors: Russell Weiner, Ann Arbor, MI (US);
Daniel R. Louiselle, Milford, MI (US);
Richard H. Trotter, Trenton, MI (US);
Jerold E. Garland, Romulus, MI (US);
Thomas C. Bochenek, Clinton Township, MI (US)

(73) Assignee: DOMINO'S IP HOLDER LLC, Ann Arbor, MI (US)

( * ) Notice: Subject to any disclaimer, the term of this patent is extended or adjusted under 35 U.S.C. 154(b) by 126 days.

(21) Appl. No.: 14/291,938

(22) Filed: May 30, 2014

(65) Prior Publication Data
US 2015/0343936 A1 Dec. 3, 2015

(51) Int. Cl.
*B60J 5/04* (2006.01)
*B60P 3/00* (2006.01)
*E05F 15/611* (2015.01)
(Continued)

(52) U.S. Cl.
CPC *B60P 3/007* (2013.01); *B60J 1/12* (2013.01); *B60J 5/0491* (2013.01); *E05D 15/463* (2013.01); *E05F 15/611* (2015.01); *B60J 5/0473* (2013.01); *E05Y 2900/00* (2013.01); *E05Y 2900/518* (2013.01); *E05Y 2900/53* (2013.01)

(58) Field of Classification Search
CPC ........ B60J 1/14; B60J 1/1892; B60J 5/0491; B60J 5/0498; B60J 5/106; B60P 3/007; E05F 11/22; E05F 11/28; E05F 15/616; E05Y 2900/518

USPC ................................................ D12/184, 196
See application file for complete search history.

(56) References Cited

U.S. PATENT DOCUMENTS

D218,600 S * 9/1970 Birchard et al. ............. D12/196
3,632,944 A * 1/1972 Lease ..................... H05B 6/129
219/622
4,632,836 A * 12/1986 Abbott ..................... A21B 7/00
296/22

(Continued)

FOREIGN PATENT DOCUMENTS

DE 2256468 A1 * 5/1974 ............ B60J 1/1892
DE 4103651 C1 * 8/1992 ............ B60J 1/1861
(Continued)

OTHER PUBLICATIONS

Notice of Allowance Dated Jul. 13, 2015, U.S. Appl. No. 29/492,377, 13 Pages.
(Continued)

*Primary Examiner* — Glenn Dayoan
*Assistant Examiner* — Paul Chenevert
(74) *Attorney, Agent, or Firm* — Brooks Kushman P.C.

(57) ABSTRACT

A delivery vehicle may include a vehicle body having a side with an opening for providing access to an interior of the vehicle, a linkage assembly connected to the vehicle body, and a door connected to the linkage assembly. The door may be movable upwardly from a lowered position, in which the door covers the opening, to a raised position for providing access to the interior of the vehicle through the opening. Furthermore, the door may be oriented generally upright in both the lowered and raised positions, and the door may be movable outwardly away from the vehicle body when the door moves from the lowered position to the raised position.

22 Claims, 5 Drawing Sheets

(51) Int. Cl.
*E05D 15/46* (2006.01)
*B60J 1/12* (2006.01)

(56) References Cited

U.S. PATENT DOCUMENTS

| | | | | |
|---|---|---|---|---|
| 4,818,009 | A | * | 4/1989 | Muscat .................... B60J 7/20 296/106 |
| 4,936,103 | A | * | 6/1990 | Newman ................ B60N 3/104 211/186 |
| 5,378,036 | A | | 1/1995 | Townsend |
| 5,470,002 | A | * | 11/1995 | DiStefano et al. ... A47J 47/145 206/522 |
| 5,524,960 | A | | 6/1996 | Townsend |
| D396,203 | S | * | 7/1998 | Uematsu ...................... D12/91 |
| 5,918,926 | A | | 7/1999 | Townsend |
| 5,921,611 | A | | 7/1999 | Townsend |
| 6,222,160 | B1 | * | 4/2001 | Remke et al. ......... A45C 11/20 219/387 |
| 6,222,987 | B1 | * | 4/2001 | Duke et al. ............. A47J 47/14 219/387 |
| D443,574 | S | * | 6/2001 | Lian ........................ D12/196 |
| D443,575 | S | * | 6/2001 | Okazaki .................. D12/196 |
| D466,848 | S | * | 12/2002 | Murkett ................... D12/196 |
| D472,863 | S | * | 4/2003 | Carroll ..................... D12/196 |
| D521,434 | S | * | 5/2006 | Fisker ...................... D12/196 |
| 7,578,540 | B2 | | 8/2009 | Houtveen |
| 7,744,035 | B2 | | 6/2010 | Saint-Jalmes et al. |
| 7,857,402 | B2 | | 12/2010 | Anikhindi et al. |
| 7,871,138 | B2 | | 1/2011 | Anikhindi et al. |
| D644,583 | S | * | 9/2011 | Kubo ....................... D12/196 |
| 8,033,055 | B2 | | 10/2011 | Oberheide et al. |
| 8,132,846 | B2 | | 3/2012 | Kitayama et al. |
| D671,471 | S | * | 11/2012 | Yamada ................... D12/196 |
| 8,308,221 | B2 | | 11/2012 | Kitayama |
| 8,328,270 | B2 | | 12/2012 | Kitayama et al. |
| D687,739 | S | | 8/2013 | Roura et al. |
| D688,978 | S | | 9/2013 | Badstuebner |
| D698,697 | S | | 2/2014 | Winkelmann et al. |
| D711,783 | S | | 8/2014 | Badstuebner |
| D712,327 | S | | 9/2014 | Tanaka et al. |
| D712,813 | S | | 9/2014 | Tanaka et al. |
| D714,190 | S | | 9/2014 | Kim |
| D714,700 | S | | 10/2014 | Yamamoto |
| D715,204 | S | | 10/2014 | Peltola et al. |
| D716,210 | S | | 10/2014 | Ishikawa et al. |
| D716,710 | S | | 11/2014 | Setina |
| D719,875 | S | | 12/2014 | Jang |
| D719,884 | S | | 12/2014 | Peltola et al. |
| D720,267 | S | | 12/2014 | Norman et al. |
| D721,023 | S | | 1/2015 | Wiedeman et al. |
| D722,933 | S | | 2/2015 | Ishikawa et al. |
| D726,082 | S | | 4/2015 | Finney et al. |
| 2001/0038217 | A1 | * | 11/2001 | Clare ...................... B60R 11/06 296/37.6 |
| 2001/0039762 | A1 | * | 11/2001 | Giovannetti .......... E05F 1/1091 49/246 |
| 2002/0048624 | A1 | * | 4/2002 | Blanchet et al. ......... A21B 1/00 426/391 |
| 2005/0052045 | A1 | * | 3/2005 | Juzwiak .................... B60R 9/02 296/37.6 |
| 2005/0091988 | A1 | * | 5/2005 | Stewart et al. ......... B60P 3/007 62/3.1 |
| 2006/0242909 | A1 | * | 11/2006 | Arquevaux ........... E05F 15/627 49/340 |
| 2007/0102957 | A1 | * | 5/2007 | Alfstad-Seibel ........... B60J 5/06 296/146.16 |
| 2008/0016781 | A1 | * | 1/2008 | Chung .................... E05F 11/28 49/445 |
| 2010/0154313 | A1 | * | 6/2010 | Elliott et al. ............ E05D 15/58 49/360 |
| 2016/0082815 | A1 | * | 3/2016 | Lee ........................ B60J 5/0486 296/146.11 |
| 2016/0121746 | A1 | * | 5/2016 | Takahashi ........... B60L 11/1818 49/242 |

FOREIGN PATENT DOCUMENTS

| | | | | |
|---|---|---|---|---|
| DE | 9207826 | U1 | * 11/1992 | ............ B60J 5/0498 |
| DE | 10159993 | A1 | * 6/2003 | ................ B60J 1/14 |
| DE | 10250304 | A1 | * 5/2004 | ............ B60J 1/1892 |
| DE | 102010011094 | A1 | * 10/2010 | ............. E05D 15/46 |
| DE | 102009050189 | A1 | * 4/2011 | ............. B62D 25/10 |
| DE | 202014105271 | U1 | * 11/2014 | ............. B60P 3/007 |
| EP | 1308375 | A2 | * 5/2003 | ............ B60J 5/0491 |
| EP | 1475503 | A2 | * 11/2004 | ............... B60J 5/106 |
| FR | 2972404 | A1 | * 9/2012 | ............ B60J 5/0491 |
| GB | 262862 | A | * 12/1926 | ............. B60P 3/007 |

OTHER PUBLICATIONS

Notice of Allowance Dated Jul. 23, 2015, U.S. Appl. No. 29/492,378, 11 Pages.
http://www.chevrolet.com/2013-spark-mini-car/exterior-pictures. html. "2013 Chevy Spark Exterior Photos", Jun. 9, 2014, 10 Pages.
Design Application and Drawings, U.S. Appl. No. 29/492,377, filed May 30, 2014, 6 Pages.
Design Application and Drawings, U.S. Appl. No. 29/492,378, filed May 30, 2014, 8 Pages.

* cited by examiner

VEHICLE WITH UPWARDLY MOVABLE DOOR

TECHNICAL FIELD

The present disclosure relates to delivery vehicles having access doors for providing access to items to be delivered.

BACKGROUND

A typical delivery vehicle may include pivoting doors and/or longitudinally slidable doors for providing access to an interior of the vehicle.

SUMMARY

A delivery vehicle according to the present disclosure may include a vehicle body having a side with an opening for providing access to an interior of the vehicle, a linkage assembly connected to the vehicle body, and a door connected to the linkage assembly. The door may be movable upwardly from a lowered position, in which the door covers the opening, to a raised position for providing access to the interior of the vehicle through the opening. Furthermore, the door may be oriented generally upright in both the lowered and raised positions, and the door may be movable outwardly away from the vehicle body when the door moves from the lowered position to the raised position.

A delivery vehicle according to another aspect of the present disclosure may include a vehicle body having a side with an opening, and a linkage arrangement including first and second spaced apart four bar linkage assemblies that are each connected to the vehicle body, and a connecting member that connects the four bar linkage assemblies together to facilitate movement of the four bar linkage assemblies. In addition, the vehicle includes a door connected to the linkage arrangement such that the door is movable upwardly from a lowered position, in which the door covers the opening, to a raised position for providing access to the vehicle through the opening, wherein the door is oriented generally upright in both the lowered and raised positions.

A door assembly, according to the present disclosure, is also provided for use with a vehicle including a vehicle body having a side with an opening. The door assembly includes a four bar linkage assembly adapted to be attached to the vehicle body, and a door adapted to be connected to the linkage assembly such that the door is movable upwardly from a lowered position, in which the door covers the opening, to a raised position for providing access to the vehicle through the opening. Furthermore, the door is oriented generally upright in both the lowered and raised positions.

While exemplary embodiments are illustrated and disclosed, such disclosure should not be construed to limit the claims. It is anticipated that various modifications and alternative designs may be made without departing from the scope of the invention.

DETAILED DESCRIPTION

Embodiments of the present disclosure are described herein. It is to be understood, however, that the disclosed embodiments are merely examples and that other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
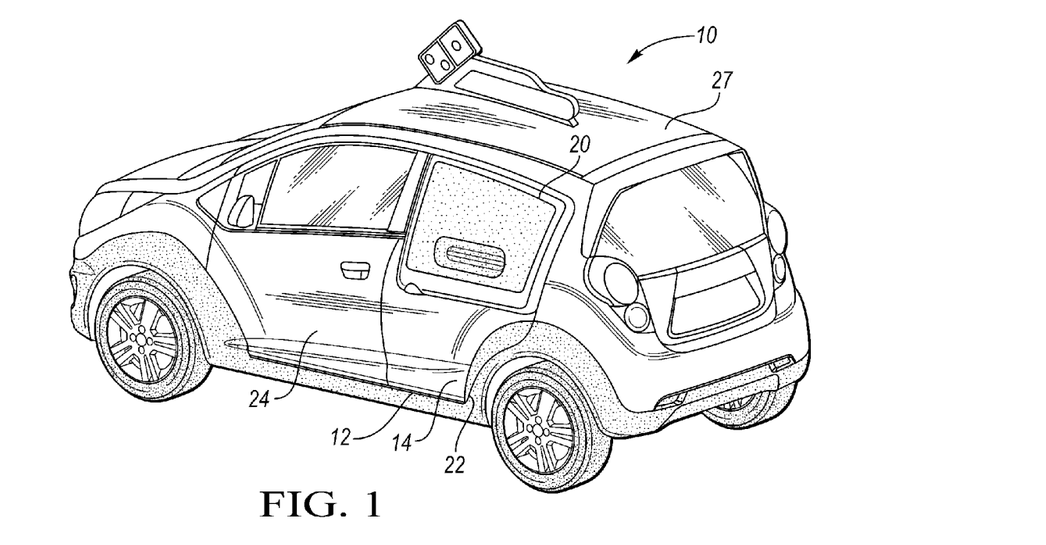
FIG. 1 is a perspective view of a delivery vehicle according to the present disclosure, including a vehicle body and an upwardly movable access door attached to the vehicle body and shown in a lowered position.
Figure 2:
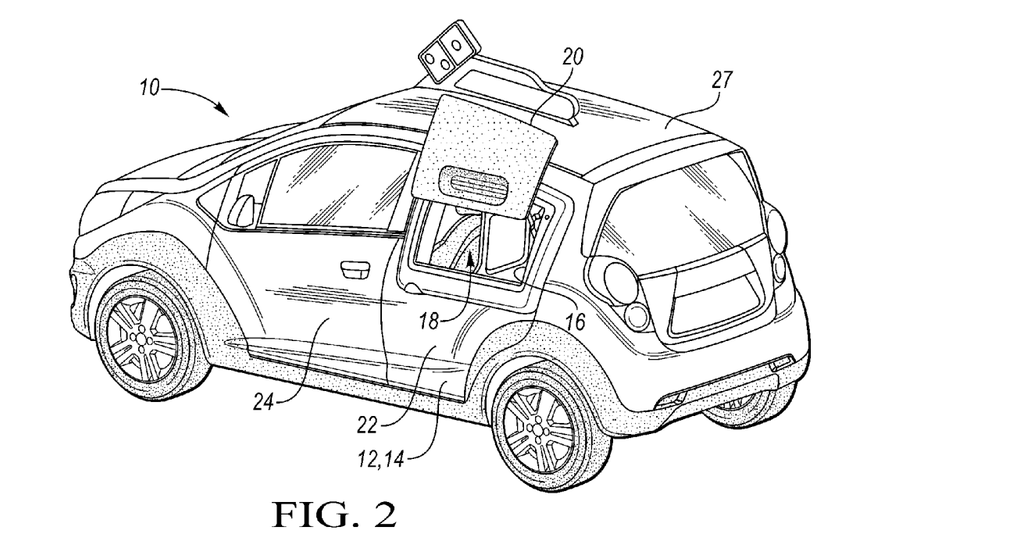
FIG. 2 is a perspective view of the delivery vehicle shown in FIG. 1, with the access door shown in a raised position.

FIGS. 1 and 2 show a delivery vehicle 10 according to the present disclosure for use in delivering items, such as food items like pizza, beverages, etc. The vehicle 10 includes a vehicle body 12 having a side 14 with an opening 16 for providing access to an interior 18 of the vehicle 10, and an upwardly movable access door 20 that is openable to provide access to the interior 18 of the vehicle 10. In the illustrated embodiment, the opening 16 is actually formed in an upper portion of a pivotable, rear driver side door 22 (e.g., rear door 22 may be pivotable about an upright axis defined by one on more hinges attached to a front portion of rear door 22), which is located behind a pivotable, driver door 24 (e.g., driver door 24 may be pivotable about an upright axis defined by one on more hinges attached to a front portion of driver door 24). For example, the opening 16 may be an enlarged version of an opening in the rear door 22 that previously received a movable window. With such a configuration, the access door 20 may provide convenient access to the interior 18 of the vehicle 10 during deliveries, while the rear door 22 may still be utilized to provide increased access to the interior 18 in order to revise or replace storage configurations that may be located behind the access door 20, for example. In another embodiment, the rear door 22 may be configured so that it is not able to pivot or otherwise open. In yet another embodiment, the access door 20 may be formed in an upper portion of a pivotable, front passenger side door; a pivotable, rear passenger side door; or a rear side of the vehicle.

Figure 3:
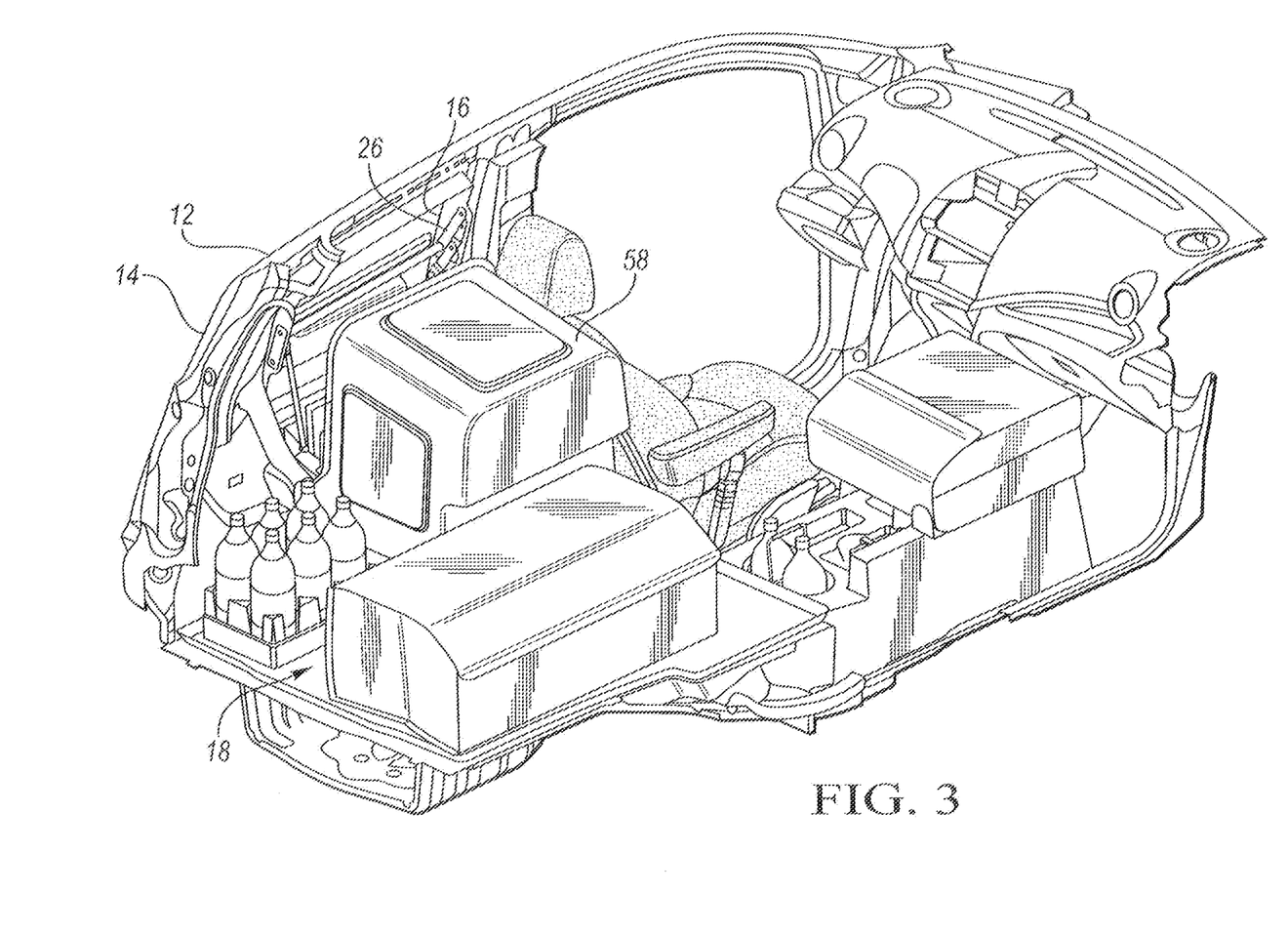
FIG. 3 is a perspective interior view of the delivery vehicle shown in FIG. 1 showing an enclosure positioned proximate the access door.
Figure 4:
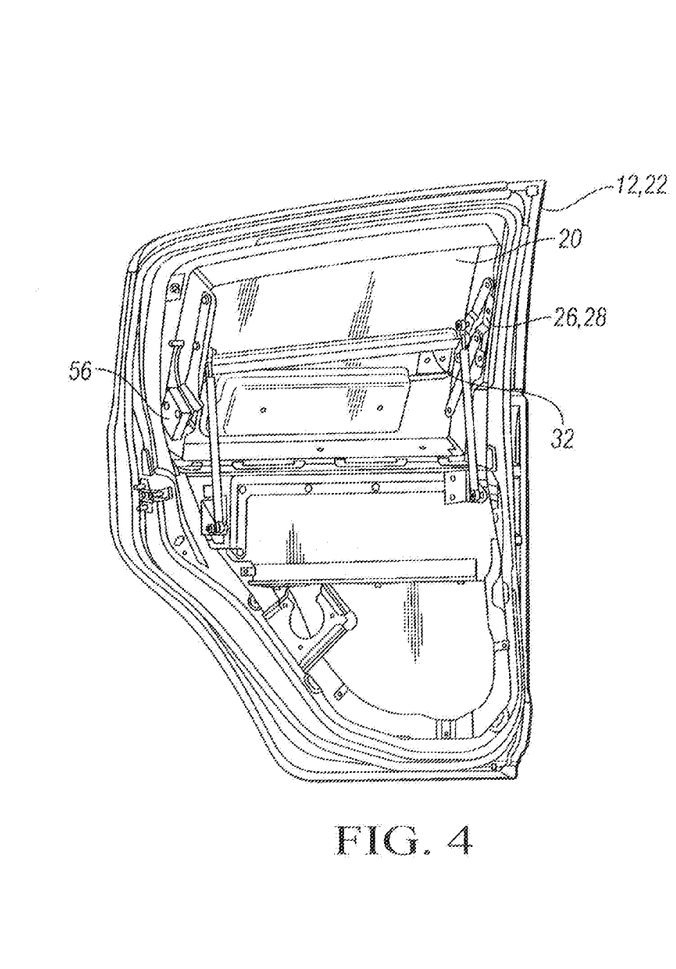
FIG. 4 is an interior view of a portion of the vehicle body and the access door, which is connected to the vehicle body with a linkage arrangement, wherein the access door is shown in the lowered position.
Figure 5:
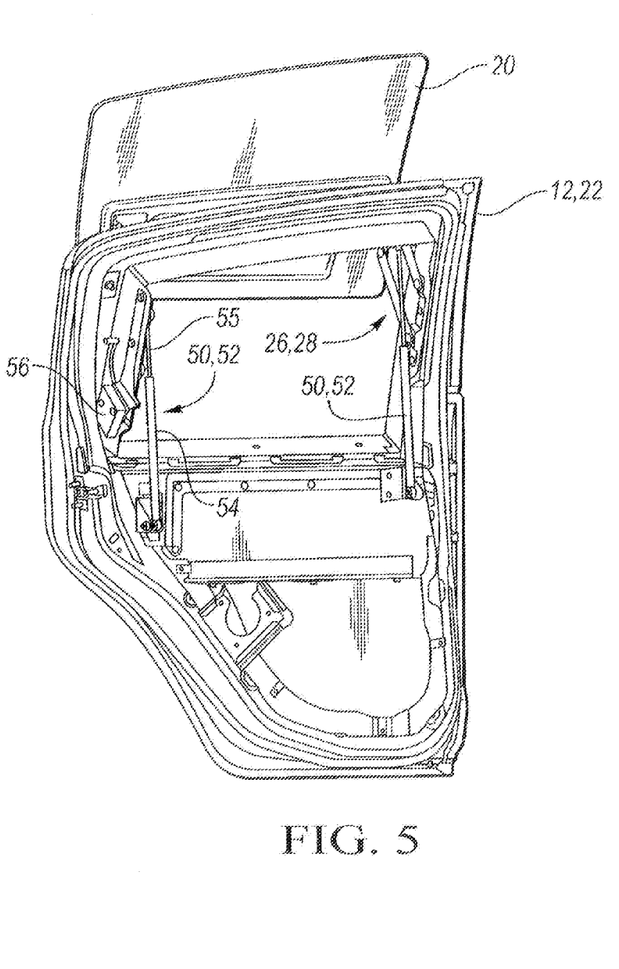
FIG. 5 is an interior view similar to FIG. 4, showing the access door in the raised position.

The access door 20 may be attached to the rear door 22 or other portion of the vehicle body 12 with an attachment mechanism 26 so that the door 20 is movable upwardly from a closed or lowered position shown in FIGS. 1, 3 and 4, in which the door covers the opening 16, to an open or raised position shown in FIGS. 2 and 5 for providing access to the interior 18 (e.g., interior passenger compartment) of the vehicle 10 through the opening 16. The door 20 may also include a handle to facilitate moving the door between the lowered and raised positions. Furthermore, the door 20 and attachment mechanism 26 are designed such that the door 20 is oriented generally upright or vertical in both the lowered and raised positions. For example, the door 20 may have generally the same upright orientation in both the lowered and raised positions, such that the orientation of the door 20 corresponds to the orientation of the portion of the vehicle body 12 that defines the opening 16 in both the lowered and raised positions. As another example, the door 20 may be generally planar, and may be parallel to a plane in which the opening 16 lies when the door 20 is in both the lowered and raised positions. The door 20 and attachment mechanism 26 may also be configured such that the door 20 door is movable outwardly away from the vehicle body 12 when the door 20 moves from the lowered position to the raised position. As further shown in FIG. 2, the door 20 extends above a roof 27 of the vehicle body 12 when the door 20 is in the raised position.

Figures 6, 7:
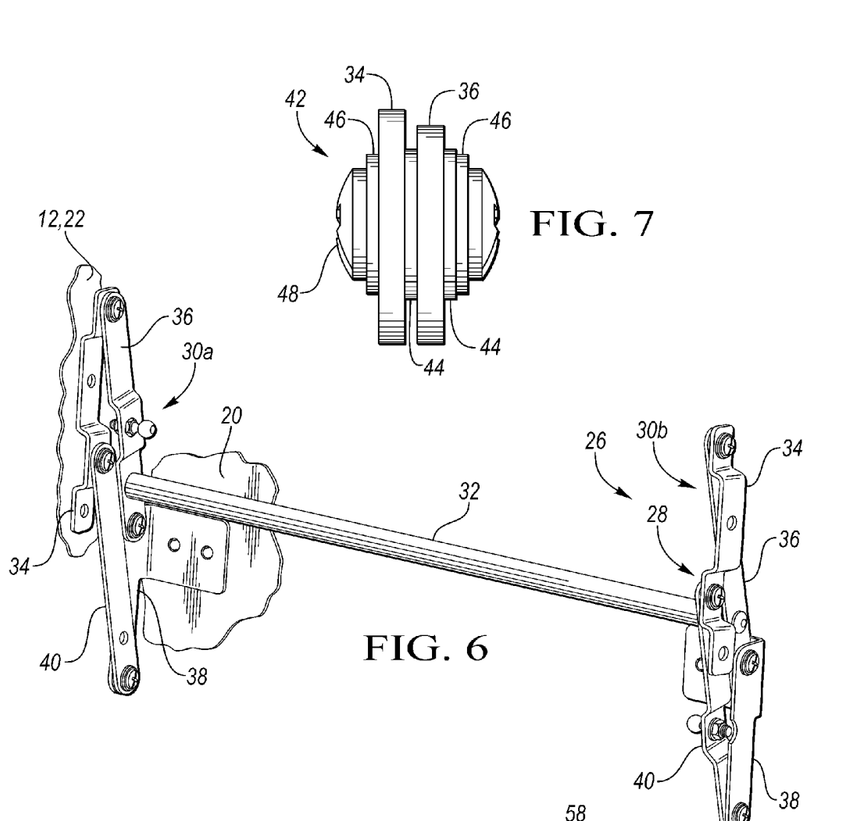
FIG. 6 is a perspective view of the linkage arrangement.
FIG. 7 is a side view of a connection arrangement for connecting components of the linkage arrangement.

While the attachment mechanism 26 may be any suitable attachment mechanism, in the embodiment shown in FIGS. 3-6, the attachment mechanism 26 is configured as a linkage arrangement 28 including first and second (e.g., right side and left side, or front and rear) spaced apart linkage assemblies 30a and 30b, respectively, and a connector member 32, such as a tie bar, that connects the linkage assemblies 30a and 30b together. As shown in FIG. 6, each linkage assembly 30a and 30b may be configured as a four bar linkage assembly including first, second, third and fourth links 34, 36, 38 and 40, respectively, that are connected together in any suitable manner, such as with one or more faster members. Each first link 34 is attachable to the vehicle body 12 in any suitable manner, such as with one or more fastener members (e.g., screws or bolts), and each third link 38 is attachable to the door 20 in any suitable manner, such as with one or more fastener members (e.g., screws or bolts). Each second link 36 has a first end movably connected to a respective first link 34, and a second end movably connected to a respective third link 38; and each fourth link 40 has a first end movably connected to a respective third link 38, and a second end movably connected to a respective first link 34.

FIG. 7 shows an example connection arrangement 42 for joining together first and second links 34 and 36, respectively, of one of the linkage assemblies 30a, 30b. The same connection arrangement 42 may be used at each link connection location of each linkage assembly 30a, 30b. The connection arrangement 42 includes one or more thrust bearings 44, with at least one of the thrust bearings 44 being positioned between two links; two washers 46 disposed on opposite outer sides of the links; and a binding post 48 that joins all of the components together.

With the above described linkage assemblies 30a and 30b, the door 20 may be moved between the lowered and raised positions while remaining generally upright. Furthermore, the connector member 32, which may be fixedly connected to one of the links or link members of each linkage assembly 30a and 30b, may facilitate movement of the door 20. For example, the connector member 32 may coordinate movement of the linkage assemblies 30a and 30b so that the linkage arrangement 28 enables smooth movement of the door 20. As another example, the connector member 32 may provide additional support to the linkage arrangement 28 so that the linkage arrangement 28 provides stable movement of the door 20.

Returning to FIGS. 4 and 5, the attachment mechanism 26 may also include one or more biasing members 50, such as one or more spring members, associated with the door 20 for urging the door 20 toward the raised position. For example, each biasing member 50 may be a spring member having one end connected to the rear door 22, or other portion of the vehicle body 12, and another end connected to the linkage arrangement 28 or the door 20. In one embodiment, each biasing member 50 may be configured as a combination biasing/dampening device, such as a spring/damper device or member 52, for urging the door 20 toward the raised position and for dampening or otherwise controlling movement of the door 20 when the door 20 is moved from the raised position toward the lowered position, as well as when the door 20 is moved from the lowered position toward the raised position. Each spring/damper member 52 may be any suitable device or mechanism, such as a hydraulic or pneumatic device that may include a cylinder member 54 and a piston or extension member 55 that is movably received in the cylinder member 54. As a more specific example, each spring/damper member 52 may be a gas pressure spring.

As also shown in FIGS. 4 and 5, the vehicle 10 may include a latch, such as electric latch 56, for locking the door 20 in the lowered position. The latch 56 may be connected to the vehicle body 12, and be activatable to engage or otherwise cooperate with the door 20 to lock the door 20 when the door 20 is in the lowered position. As another example, the latch 56 may be connected to the door 20, and be activatable to engage or otherwise cooperate with the vehicle body 12 to lock the door 20 when the door 20 is in the lowered position.

Figure 8:
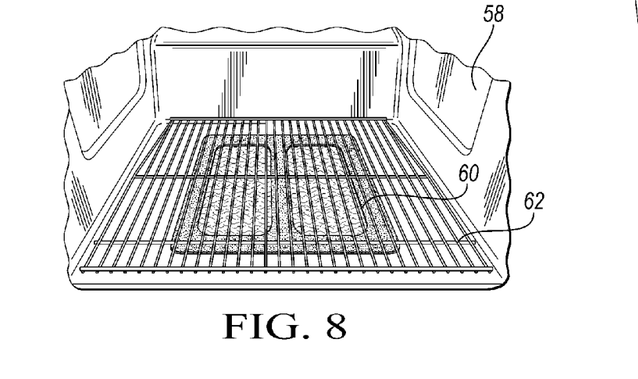
FIG. 8 is an interior view of the enclosure shown in FIG. 3.

Returning to FIG. 3, a compartment or enclosure 58 may be provided in the interior 18 of the vehicle 10 proximate the door 20 when the door 20 is in the lowered position. The enclosure 58 may be configured to be sealed against the door 20 when the door 20 is in the lowered position, or the enclosure 58 may be spaced away from the door 20 when the door 20 is in the lowered position. The enclosure 58, which may be made of any suitable material such as plastic or metal, may be configured to receive and store food containers, such as one or more pizza boxes that each include a hot pizza. Referring to FIG. 8, the vehicle 10 may further include a heating element 60, such as an electric heating element, positioned in or otherwise associated with the enclosure 58 for heating items positioned in the enclosure 58, and a rack 62, such as an oven rack, for supporting items positioned in the enclosure 58. When the door 20 is in the raised position, access may be provided to the enclosure 58 through the opening 16 so that any of the items stored in the enclosure 58 may be removed.

Figure 9:
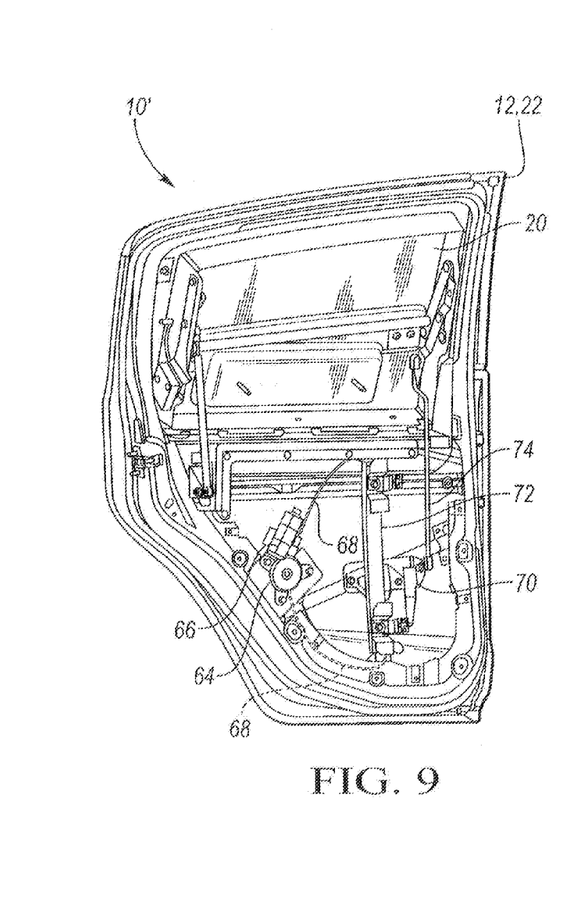
FIG. 9 is an interior view, similar to FIG. 4, of a second embodiment of a vehicle according to the present disclosure, showing an access door in a lowered position, and a motor assembly attached to the access door.
Figure 10:
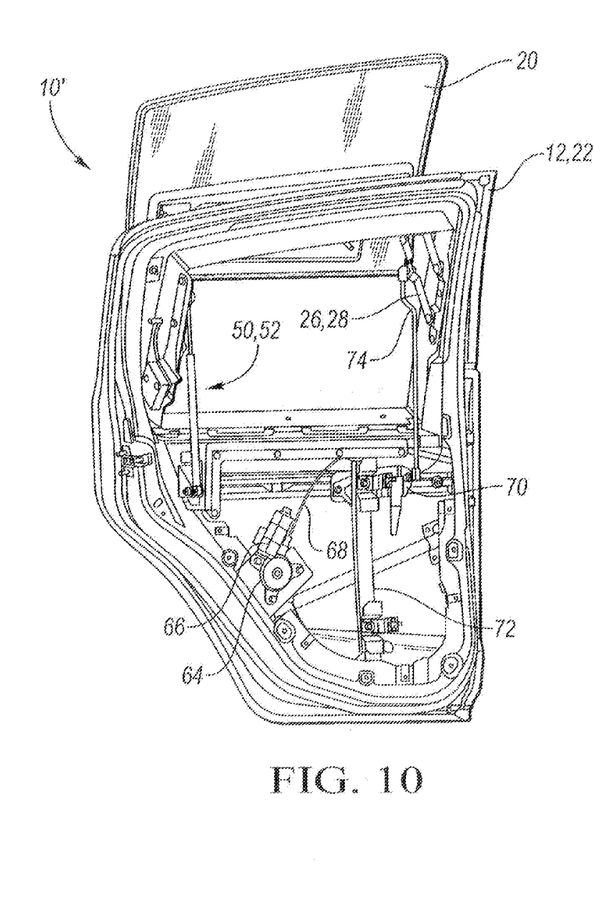
FIG. 10 is an interior view of the vehicle shown in FIG. 9 showing the access door in a raised position.

FIGS. 9 and 10 show another embodiment 10' of a vehicle according to the present disclosure. The vehicle 10' includes similar features as the vehicle 10, and those features are identified with the same reference numbers. The vehicle 10' further includes a motor assembly 64 for automatically moving door 20 between a lowered position, shown in FIG. 9, and a raised position, shown in FIG. 10. While the motor assembly 64 may have any suitable configuration, in the illustrated embodiment, the motor assembly 64 includes an electric motor 66 mounted to rear door 22 or other portion of vehicle body 12, a cable 68 attached to the electric motor 66, a slide member 70 attached to the cable 68, and a guide track 72 attached to the rear door 22 or other portion of the vehicle body 12 for guiding movement of the slide member 70. The cable 68 may have first and second ends connected to first and second portions, respectively, (e.g., top and bottom portions) of the slide member 70. The slide member 70 is further connected to a linkage assembly 30a or 30b of linkage arrangement 28 with a connector member 74, such as a push/pull rod, so that movement of the slide member 70 causes movement of the door 20.

In one embodiment, the motor assembly 64 may be or include an automatic window regulator. For example, the motor assembly 64 may include a window regulator that may have been provided with the rear door 22 when the rear door 22 was first manufactured.

The electric motor 66 may be activated in any suitable manner, such as with a remote control device or a vehicle mounted actuator, in order to move the door 20 between the lowered and raised positions. To open the door 20, the electric motor 66 is operable to move the cable 68 (e.g., pull the cable) to thereby move the slide member 70 upwardly along the guide track 72, so that the slide member 70 pushes the rod 74 upwardly in order to move the linkage arrangement 28 and the door 20 to the raised position shown in FIG. 10. To close the door 20, the electric motor 66 may be operated to move the cable 68 in an opposite direction to thereby move the slide member 70 downwardly along the guide track 72, so that the slide member 70 pulls the rod 74 downwardly in order to move the linkage arrangement 28 and the door 20 to the lowered position shown in FIG. 9.

As shown in FIGS. 9 and 10, the vehicle 10' may also include one or more biasing members 50 associated with the door 20 for facilitating movement of the door 20, such as described above with respect to the vehicle 10. Furthermore, each biasing member 50 may be configured as a combination biasing/dampening device, such as a spring/damper device or member 52, for urging the door 20 toward the raised position and for dampening or otherwise controlling movement of the door 20 when the door 20 is moved from the raised position toward the lowered position, as well as when the door 20 is moved from the lowered position toward the raised position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A delivery vehicle comprising:
   a vehicle body having a lateral side with an opening in an upper portion of the lateral side for providing access to an interior of the vehicle;
   a linkage assembly connected to the vehicle body; and
   an access door connected to the linkage assembly such that the access door is movable upwardly from a lowered position, in which the access door covers the opening, to a raised position for providing access to the interior of the vehicle through the opening, wherein the access door is oriented generally upright in both the lowered and raised positions, and wherein the access door is movable outwardly away from the vehicle body when the access door moves from the lowered position to the raised position; wherein the vehicle body includes a side door, and the opening is defined in an upper portion of the side door.

2. The vehicle of claim 1 wherein the vehicle body has a roof, and the access door extends above the roof when the access door is in the raised position.

3. The vehicle of claim 1 wherein the side door is a pivotable rear door that is pivotable about an upright axis, and the access door is connected to the rear access door with the linkage assembly.

4. The vehicle of claim 1 further comprising a biasing member associated with the access door for urging the access door toward the raised position.

5. The vehicle of claim 1 further comprising a spring/damper device associated with the access door for urging the access door toward the raised position, and for dampening movement of the door when the access door is moved toward the lowered position.

6. The vehicle of claim 1 wherein the side door is a rear side door.

7. The vehicle of claim 1 wherein the side door is configured such that the side door is not openable.

8. The vehicle of claim 1 wherein the linkage assembly comprises a four bar linkage assembly.

9. The vehicle of claim 8 further comprising an additional four bar linkage assembly that connects the access door to the vehicle body, and a tie bar that connects the linkage assemblies together.

10. The vehicle of claim 1 further comprising an enclosure positioned in the interior of the vehicle proximate the access door when the door is in the lowered position.

11. The vehicle of claim 10 further comprising a heating element associated with the enclosure for heating items positioned in the enclosure.

12. The vehicle of claim 1 further comprising a motor assembly associated with the linkage assembly for automatically moving the access door between the lowered and raised positions.

13. The vehicle of claim 12 wherein the motor assembly comprises an electric motor, a cable attached to the electric motor, a slide member attached to the cable, and a guide track attached to the vehicle body for guiding movement of the slide member, wherein the slide member is attached to the linkage assembly.

14. The vehicle of claim 13 wherein the slide member is connected to the linkage assembly by a push/pull rod.

15. A delivery vehicle comprising:
   a vehicle body having a lateral side with an opening in an upper portion of the lateral side;
   a linkage arrangement including first and second spaced apart four bar linkage assemblies that are each connected to the vehicle body, and a connecting member that connects the four bar linkage assemblies together to facilitate movement of the four bar linkage assemblies; and
   an access door connected to the linkage arrangement such that the access door is movable upwardly from a lowered position, in which the access door covers the opening, to a raised position for providing access to the vehicle through the opening, wherein the access door is oriented generally upright in both the lowered and raised positions;
   wherein the vehicle body includes a side door, and the opening is defined in an upper portion of the side door.

16. The vehicle of claim 15 further comprising a spring/damper mechanism associated with one of the four bar linkage assemblies for urging the access door toward the raised position, and for dampening movement of the access door when the access door is being moved toward the lowered position.

17. The vehicle of claim 15 further comprising an enclosure positioned proximate the access door when the access door is in the lowered position.

18. The vehicle of claim 15 wherein the vehicle body has a roof, and the access door extends above the roof when the access door is in the raised position.

19. The vehicle of claim 15 wherein the side door is configured such that the side door is not openable.

20. The vehicle of claim 15 further comprising a motor assembly associated with at least one of the four bar linkage assemblies for automatically moving the access door between the lowered and raised positions.

21. The vehicle of claim 20 wherein the motor assembly comprises an electric motor, a cable attached to the electric motor, a slide member attached to the cable, and a guide track attached to the vehicle body for guiding movement of the slide member, wherein the slide member is attached to the at least one four bar linkage assembly.

22. A delivery vehicle comprising:
a vehicle body having a lateral side with an opening in an upper portion of the lateral side for providing access to an interior of the vehicle;
a linkage assembly connected to the vehicle body;
an access door connected to the linkage assembly such that the access door is movable upwardly from a lowered position, in which the access door covers the opening, to a raised position for providing access to the interior of the vehicle through the opening, wherein the access door is oriented generally upright in both the lowered and raised positions, and wherein the access door is movable outwardly away from the vehicle body when the access door moves from the lowered position to the raised position; and
a motor assembly associated with the linkage assembly for automatically moving the access door between the lowered and raised positions, the motor assembly including an electric motor, a cable attached to the electric motor, a slide member attached to the cable, and a guide track for guiding movement of the slide member, wherein the slide member is attached to the linkage assembly by a push/pull rod.

* * * * *

UNITED STATES PATENT AND TRADEMARK OFFICE
CERTIFICATE OF CORRECTION

Page 1 of 1

PATENT NO. : 9,452,703 B2
APPLICATION NO. : 14/291938
DATED : September 27, 2016
INVENTOR(S) : Russell Weiner et al.

It is certified that error appears in the above-identified patent and that said Letters Patent is hereby corrected as shown below:

In the claims

Column 6, Line 20, Claim 5:

After "movement of the"
Insert -- access --.

Column 6, Line 34, Claim 10:

After "access door when the"
Insert -- access --.

Signed and Sealed this
Twentieth Day of December, 2016

Michelle K. Lee
*Director of the United States Patent and Trademark Office*